Figure 1:
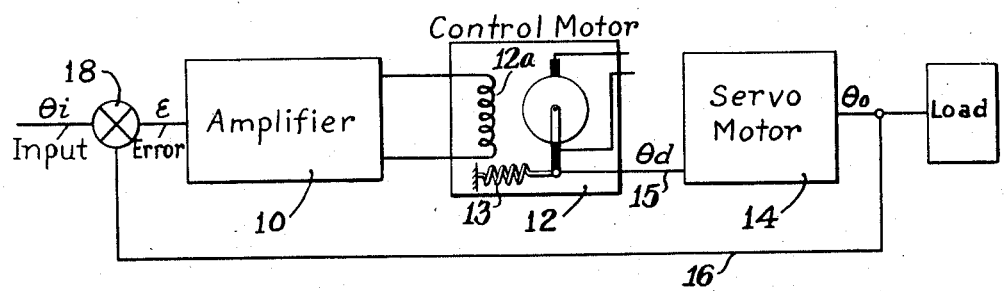

Feb. 7, 1950          A. C. HALL          2,496,391

SERVOMECHANISM

Filed Oct. 24, 1944          2 Sheets-Sheet 1

UNITED STATES PATENT OFFICE 2,496,391

SERVO MECHANISM

Albert C. Hall, Boston, Mass., assignor, by mesne assignments, to Research Corporation, New York, N. Y., a corporation of New York Application October 24, 1944, Serial No. 560,184

12 Claims. (Cl. 121—41)

The present invention relates to servomechanisms, and more particularly to means for improving the transient response thereof.

A servomechanism may be defined as a power-amplifying device in which the element driving the output is actuated in accordance with some function of the "error," that is, the difference in position between the servo input and the output. In a so-called proportional servo, the control is effected by the magnitude of the error only, so that some error is always present, since no control is possible without a difference between the input and the output.

Various devices have been proposed in an effort to reduce or eliminate the errors. Generally, the errors may be considered in two classes, namely, steady-state errors and transient errors. Steady-state errors may be substantially eliminated under certain specified conditions by the use of so-called integral controllers; for example, it is possible to design a servo in which the output will follow a constant-velocity input with zero, or substantially zero, error.

The present invention is mainly concerned with transient errors. Upon the application of any input to the servo, the output will not immediately assume its steady-state condition, but will be subject to a transient error, which in a stable system decays in an exponential fashion with time. The speed of response of the servo, and hence its value in many applications, depends on the rapidity with which the transient errors die out. It will be understood that some transient errors are unavoidable because of the inertia of the system and the finite power of the controller, but it is the object of this invention to provide means for effecting the optimum reduction of transient errors.

It has been recognized in theory that improved servo response may be secured by using in a servo-controller a device whose output involves a term proportional to the time rate of change of the input. Such a controller has been known as a derivative controller. The use of second and even higher derivatives with respect to time has also been proposed. One of the difficulties in servo synthesis, so far as it relates to these derivative controllers, is that no form of true derivative control is physically realizable. A true derivative control would require an output that approached infinity as the frequency became large without limit; in other words, infinite power would be necessary. Since this requirement of derivative control cannot even be approximated, such devices have been of only theoretical interest.

I have discovered that significant improvements in the transient response of a servo may be attained by utilizing lead controlling means, as distinguished from derivative controls. For example, as will be shown later, a physically realizable lead controller with relatively small attenuation may be constructed in such a way as to provide a substantial reduction in the transient error of the servomechanism. It will also be shown that for a given servo, there is an optimum improvement attainable for any predetermined amount of tolerable controller amplification. It is the object of this invention to construct a servomechanism and compensating devices therefor, whereby this optimum may be substantially attained.

In general, my invention has to do with lead controllers which produce a positive phase angle to compensate for the negative phase angle introduced by the inertia of the servo motor and load, time lags in the controlled member and time lags in the controller. The natural frequency of the system is increased by use of such networks, with the result that the optimum response to a transient input is obtained. This optimum can be attained only by a correct matching of the lead controller to the servo.

Figure 2:
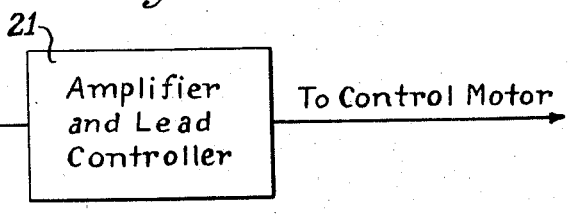
Figure 3:
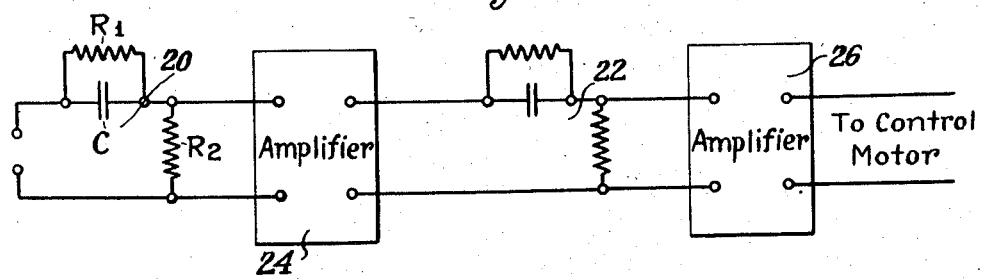
Figure 4:
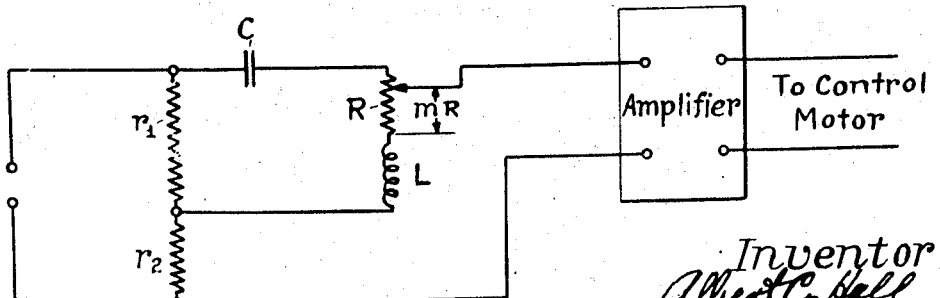
Figure 5:
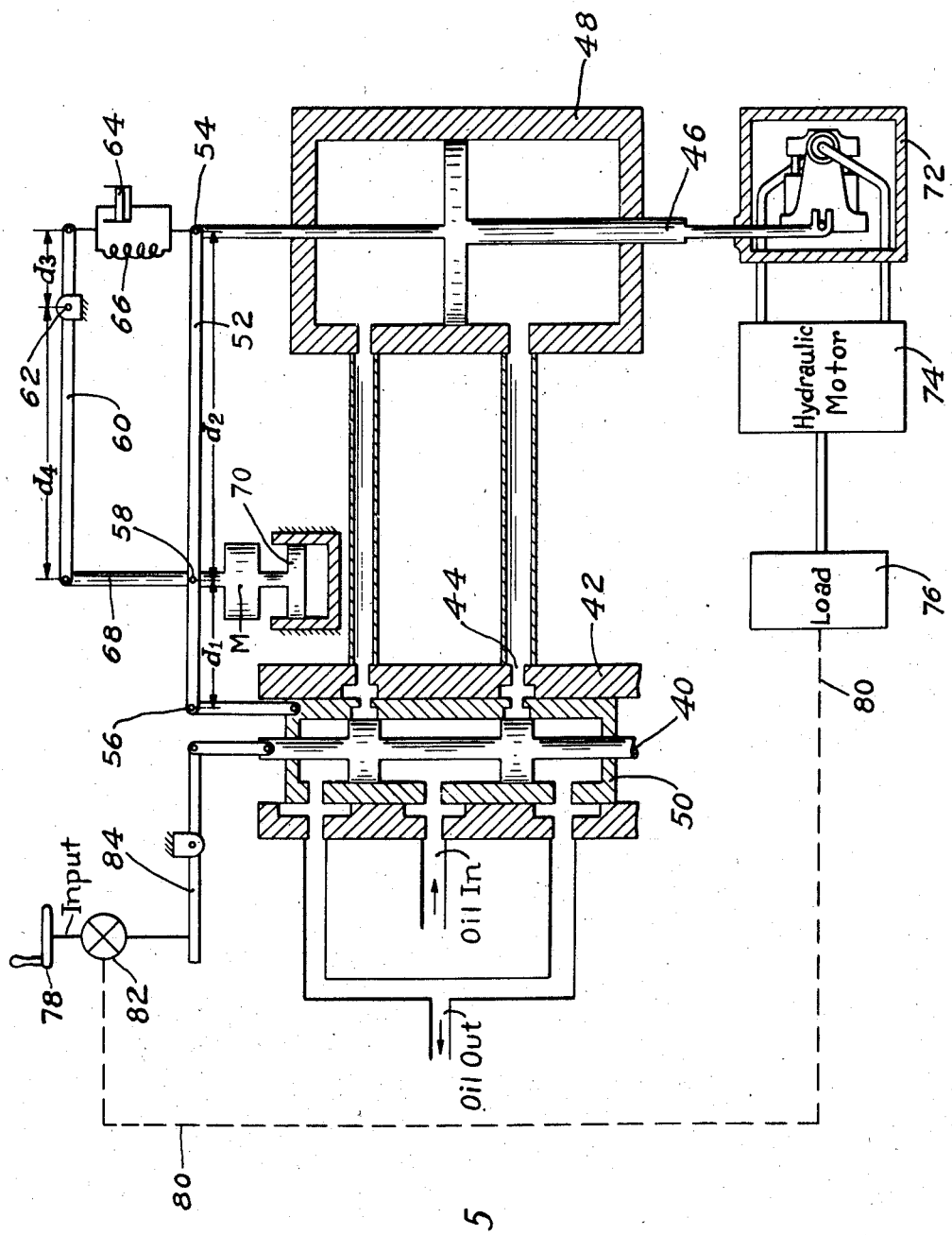

In the accompanying drawings, Fig. 1 is a diagram of a simple servomechanism; Fig. 2 is a diagram illustrating the application of lead control; Figs. 3 and 4 are diagrams of lead control circuits; and Fig. 5 is a diagram of a lead controller and amplifier for a hydraulic system.

An explanation of the present invention will be preceded by a discussion of theoretical principles, as related to a simple physical form of control motor. In Fig. 1 is shown diagrammatically a complete servo involving an amplifier 10, a control motor 12, and a servo motor 14 which drives a load. A "feed-back" link 16 leads from the output through a differential device 18 to the input. A mechanical form of differential is shown in the patent to Minorsky No. 1,703,317 (Fig. 2, part 58) and an electrical form is shown in the Brown and Forrester Patent No. 2,409,109 (parts 8 and 10).

Although the system shown in Fig. 1 may comprise electrical, mechanical or hydraulic components, or various combinations thereof, it will be convenient to assume that the amplifier 10 is an ideal electronic amplifier having a constant gain $k_p$ at all frequencies, that the control motor 12 is an electric motor having a torque proportional to the amplifier output, and that the servo motor 14 is a hydraulic motor. The control motor has a field winding 12a, and its rotor is constrained by a spring 13. The rotor is connected to a member 15 which controls the output of the servo motor 14, whereby an angular displacement of the rotor varies the speed of the servo motor. The output velocity of the servo motor is instantaneously proportional to the displacement from neutral of the member 15. These simplifying assumptions are not limitations on the inventions to be described but are made only for the purpose of simplifying the explanation of the system. The feed-back link 16 and differential 18 may be any device for comparing the output and input quantities, and may be differentials, potentiometers, synchros, etc.

For any displacement $\theta_i$ of the input, there will be a displacement $\theta_0$ of the output. The difference $\theta_i - \theta_0$ is the error $\epsilon$, and this error constitutes the "input" to the servo. The quantities $\theta_i$, $\theta_0$ and $\epsilon$ are functions of time. It is convenient to consider the various displacements, not as functions of time, but as functions of frequency, for which purpose the Laplacian transforms of $\theta_1$, $\theta_0$ and $\epsilon$ are preferably used. These may be designated $\Theta_i(s)$, $\Theta_0(s)$ $E(s)$, respectively.

The defining quantity of the system described is the ratio $$\frac{\Theta_0(s)}{E(s)}$$

which is called the transfer-function. In general it is the ratio of the transform of the output displacement to the transform of the input displacement, (the input in this case being the error). The ratio known as the transfer-function of the servo corresponds to the voltage-transfer ratio of a four-terminal network.

The variable $s$ is a complex variable. To determine any of the functions in terms of frequency, $j\omega$ may be substituted for $s$.

The transfer-function in any case comprises a frequency dependent portion $G(s)$ and a factor K which is independent of frequency. In general, for any servo $$KG(s) = \frac{\Theta_0(s)}{E(s)} \quad (1)$$

For the simple system shown in Fig. 1, let $J$ = moment of inertia of control motor
$f$ = viscous damping coefficient (assuming that all dissipation of mechanical energy may be represented by viscous damping).
$k_p$ = amplifier and control motor constant
$k_d$ = elastic restraining force on motor output
$k_m$ = servo motor constant Then it can be shown that the transfer-function $$KG(s) = k_p k_m \frac{1}{s(Js^2 + fs + k_d)} \quad (2)$$

This is a "third-order" system, because its transfer-function involves a third-degree expression in $s$.

The derivation of (2) is as follows: It is assumed that the torque of the control motor is proportional to the amplifier input $$T = k_p E(s) \quad (2a)$$

the torque is equated to the inertial, damping and elastic torques of the control motor.

$$T = (Js^2 + fs + k_d) \Theta_d(s) \quad (2b)$$

where $\Theta_d(s)$ is the Laplacian transform of the control motor output, which constitutes the displacement of the member by which the servo motor 14 is controlled. It is further assumed that the output velocity of the servo motor is proportional to the input displacement $\Theta_d(s)$, that is $$s \Theta_0(s) = k_m \Theta_d(s) \quad (2c)$$

From these equations T and $\Theta_d$ are eliminated to obtain (2).

To convert (2) into more useful form, let $$\frac{k_d}{J} = \omega_0^2$$

where $\omega_0$ is the "natural frequency" of the control motor $$\frac{f}{J} = 2\zeta\omega_0$$

where $\zeta$ is the "damping constant" of the control motor and is the ratio of the actual damping coefficient to that required for critical damping.

Then Equation 2 becomes $$KG(s) = \frac{k_p k_m}{J} \frac{1}{s(s^2 + 2\zeta\omega_0 s + \omega_0^2)} \quad (3)$$

The frequency-dependent portion of this expression may be factored, so that $$G(s) = \frac{1}{s(s+c_1)(s+c_2)} \quad (4)$$

where $c_1$ and $c_2$ are real or complex depending on the values of $\zeta$ and $\omega_0$.

It is the factors $s+c_1$ and $s+c_2$ that contribute to the slowness of the servo system. This can be shown by the fact that the expression for the output of the servomechanism, as related to the input, as a function of time, involves terms of the form $e^{-at}$, where the $a$'s depend upon the values of the $c$'s. The real parts of $c_1$ and $c_2$ must be positive to insure stability. The larger the real parts of $c_1$ and $c_2$, the more rapidly will transients die out. The terms $s+c_1$ and $s+c_2$ may also be considered as lag-factors, which necessarily appear because the fact that the servo as a physical system demands their presence. It is the object of this invention to provide means for reducing their effect.

In Fig. 2 is shown a system similar to that of Fig. 1, but embodying a lead-controlling or compensating network 21. One form of controller is shown in Fig. 3. This involves two resistance-capacitance networks 20 and 22 and two amplifiers 24 and 26. The total gain of the two amplifiers is $k_p$ which is assumed constant for all frequencies. One purpose of using two amplifiers instead of a single one is to provide a buffer between the networks 20 and 22, whereby the transfer-function of both networks may be taken as the product of the transfer-functions of the independent networks.

Considering the first network 20, its transfer function is $$\frac{1}{\alpha_1} \frac{1 + \frac{s}{\omega_1}}{1 + \frac{s}{\alpha_1 \omega_1}}$$

where $$\omega_1 = \frac{1}{R_2 C_2}$$

and $$\alpha = \frac{R_1 + R_2}{R_1}$$

the network attenuation constant.

Letting $\omega_1$ and $\alpha_1$ apply to the first network 20 and $\omega_2$ and $\alpha_2$ to the second network 22, the transfer-function of the lead controller is $$\frac{k_p}{\alpha_1\alpha_2} \frac{1+\frac{s}{\omega_1}}{1+\frac{s}{\alpha_1\omega_1}} \frac{1+\frac{s}{\omega_2}}{1+\frac{s}{\alpha_2\omega_2}} \quad (5)$$

The transfer-function of the entire system of Fig. 2 is given by taking the product of the transfer-function of the uncompensated system and that of the compensating network, that is, the overall transfer-function is $$\frac{k_p k_m}{J\alpha_1\alpha_2} \frac{1}{s(s^2+2\zeta\omega_0 s+\omega_0^2)} \frac{1+\frac{s}{\omega_1}}{1+\frac{s}{\alpha_1\omega_1}} \frac{1+\frac{s}{\omega_2}}{1+\frac{s}{\alpha_2\omega_2}} \quad (6)$$

A simple example is given by taking $\zeta=1$ (critical damping) so that $c_1=c_2=\omega_0$. Then if the network constants are so chosen that $$\omega_1=\omega_2=\omega_0 \text{ and } \alpha_1=\alpha_2=\alpha \quad (7)$$

Equation 6 becomes $$\frac{k_p k_m}{J\alpha^2}\frac{1}{s(s+\omega_0)^2}\frac{\left(1+\frac{s}{\omega_0}\right)^2}{\left(1+\frac{s}{\alpha\omega_0}\right)^2} = \frac{k_p k_m}{J\alpha^3}\frac{1}{\frac{s}{\alpha}\left(\frac{s}{\alpha}+\omega_0\right)^2} \quad (8)$$

where the numerator term $$\left(1+\frac{s}{\omega_0}\right)^2$$

due to the compensating circuit has just cancelled a similar term in the denominator due to the uncompensated system. The frequency-dependent portion of (8) is exactly similar to that of the uncompensated system, except that $$\frac{s}{\alpha}$$

now takes the place of $s$. This means that the resonant frequency is now $\alpha\omega_0$ instead of $\omega_0$, in other words, the entire frequency scale is expanded by the factor $\alpha$.

If the damping of the original system were greater than critical ($\zeta>1$), it is possible to select the attenuation constants $\alpha_1$ and $\alpha_2$ of the network in such a way as to effect cancellation of the terms $(s+c_1)$ and $(s+c_2)$ in the denominator of (4) so that the compensated system will have a transfer-function like (8) with damping factor equal to unity and a frequency scale likewise expanded by the factor $\alpha$ (where $\alpha^2$ now equals $\alpha_1\alpha_2$).

As an example consider a servo with a two stage lead-controller, the entire system having a transfer-function (6) but with $\zeta>1$. Then the two stages of the lead-controller must have dissimilar values of $\tau$ and $\alpha$ in order that maximum improvement may be obtained. The quadratic expression in the denominator factors into $$s+\omega_1(\zeta-\sqrt{\zeta^2-1}) \text{ and } s+\omega_1(\zeta+\sqrt{\zeta^2-1})$$

The cancellation of terms by which optimum performance is attained is accomplished by taking $$\frac{1}{\tau_1\alpha_1}=\omega_1(\zeta-\sqrt{\zeta^2-1})$$

and $$\frac{1}{\tau_2\alpha_2}=\omega_1(\zeta+\sqrt{\zeta^2-1})$$

The total attenuation $\alpha^2$, which equals $\alpha_1\alpha_2$, is allocated to the two stages in such fashion that $$\alpha_1=\frac{\alpha}{\zeta-\sqrt{\zeta^2-1}} \quad (9)$$

and $$\alpha_2=\frac{\alpha}{\zeta+\sqrt{\zeta^2-1}} \quad (10)$$

In such a case an expression identical with (8) is obtained, showing that the compensated servo has a damping factor of unity and a frequency scale expanded by the factor $\alpha$. It is readily shown that the system performance is improved not only by expanding the frequency scale but by adjusting the damping factor $\zeta$ to its optimum value.

Equation 10 indicates the limit to which this procedure can be carried. Since all attenuation factors must be greater than unity, it is necessary that $$\alpha>\zeta+\sqrt{\zeta^2-1}$$

Thus for $\zeta=1.25$, $\alpha$ must be greater than 2.0, that is, the total attenuation $\alpha^2$ must be greater than 4. If $\alpha^2$ were chosen as 4, the factor $\alpha_2$ for the second stage would be exactly unity. This means that for a total attenuation equal to or less than 4, the second stage would be omitted altogether and the lead-control function could be satisfactorily assumed by a single stage. In fact $\alpha^2$ should be substantially greater than 4 to justify use of a second stage. For example with $\alpha^2=6.25$, $\alpha=2.5$, then $\alpha_2=1.25$, which is insufficient to justify an added stage. In general a stage of lead control may be omitted unless an attenuation factor of at least 2 can be allocated to it.

The extension of the frequency scale means that a system having an original resonant frequency of, say 1 cycle per second can be converted to one in which the resonant frequency is $\alpha$ cycles per second. The effect on transient response is indicated by transforming expressions involving frequency to those involving time, according to Laplacian transform theory.

On the time-scale, expressions involving terms in $e^{-at}$ then become $e^{-a\alpha t}$. Since $\alpha>1$, the rate of transient decay is greatly increased. It may be said that the time-scale is compressed by the factor $\alpha$. For example, if on a transient impulse, it took the uncompensated system T seconds to reduce the transient error to a certain fraction of its original value, the compensated system would accomplish the same reduction of error in $$\frac{T}{\alpha}$$

seconds.

The lead controller network shown in Fig. 3 has the property of attenuating low frequencies. At zero frequency the voltage is reduced by the factor $$\frac{1}{\alpha}$$

at infinite frequency it is not reduced at all. What is desired is an increase in response to high frequencies, and this is accomplished by attenuating the low frequencies and then amplifying all frequencies by a constant amount. Assuming that the amplification is always sufficient to compensate for low-frequency attenuation, the frequency range is extended by the amount $\alpha$. Thus, the greater the value of $\alpha$, if proper amplification is provided, the greater will be the extension of the frequency range and the more rapid will be the response of the servo.

It will be understood that mere amplification, without low-frequency attenuation, would be ineffective, because as the gain is increased, a point is reached where the system would become unstable, and the transient, instead of decaying to zero, would tend to increase indefinitely with time.

Equation 8 appears to indicate that $\alpha$ may be indefinitely increased with a corresponding improvement in performance; thus with infinite attenuation, it would be possible to make a servo with a zero time lag. There are many reasons why this result is unattainable, the principal of which is that infinite amplification and hence infinite power would be required. Furthermore, not even an approximation to the infinite condition can be reached, even if very large attenuations could be tolerated. The limitations on tolerable values of attenuation will be discussed later, but first a further discussion of the third-order case and a generalization for more complicated cases will be given.

In the foregoing, the damping factor $\zeta$ has been taken $\geq 1$, that is, it has been assumed that the damping of the original servo has been greater than critical damping. In most cases this condition does not exist, and it is more usual to find that the servo is not sufficiently damped. Thus $\zeta$ may be about 0.1, which means that the transient will be oscillatory and will not die out in a sufficiently short time. A damping factor between 0.5 and 1 is usually considered best. The quadratic expression may be factored as before into $$(s^2 + \zeta\omega_0 s + \omega_0^2) = (s+c_1)(s+c_2)$$

but here $c_1$ and $c_2$ are complex. The simple cascaded lead controller networks of Fig. 3 cannot be used to set up terms which will cancel these complex factors.

It is therefore necessary to provide a lead controller which will permit extension of the frequency range in this complex case, and also bring the ultimate damping factor up to an optimum value. This may be accomplished by the lead controlling network of Fig. 4, for which the transfer function is approximately $$k_p \left[ \frac{r_2}{r_1+r_2} \frac{r_1}{r_s+r_s} \frac{L_s m_R}{L_s + R + \frac{1}{C_s}} \right] \quad (11)$$

This expression assumes that the resistances $R$ and $r_2$ are sufficiently small so that the impedance looking toward the input from the terminals of $r_1$ is negligible, but this approximation is sufficiently close for practical purposes.

Let $$\frac{r_1+r_2}{r_2} = \alpha_0^2$$

the attenuation constant of the network. Then the transfer function of the network becomes $$KG(s) = k_p \frac{LCs^2 + RCns + \frac{1}{\alpha_0^2}}{LC_s^2 + RC_s + 1} \quad (12)$$

where $$\frac{1}{n} = m + \frac{1-m}{\alpha_0^2} \quad (13)$$

Equation 10 may be cast into a form involving the natural frequency and damping factor by taking $$\frac{1}{\alpha^2 Lc} = \omega_c^2 \text{ and } \frac{R}{nL} = 2\zeta_c\omega_c$$

whence $$KG(s) = k_p \frac{s^2 + 2\zeta_c\omega_c s + \omega_c^2}{s^2 + 2\zeta_c n\omega_0 s + \alpha_0^2 \omega_c^2} \quad (14)$$

Since $m$ may vary between 0 and 1, $n$ may have any value between 1 and $\alpha_0^2$. It will be seen that if this controlling network is used with a servo having the transfer-function (3), with $\omega_c = \omega_0$ and $\zeta_c = \zeta$, the ultimate damping ratio $\zeta_T$ may take on any desired value between $$\frac{\zeta}{\alpha_0}$$

depending on the value of $n$. The resonant frequency of the compensated system is $\alpha_0$ times the resonant frequency of the uncompensated system, thus, as in the case of Fig. 3, the frequency scale is expanded by the factor $\alpha_0$ and the time-scale is correspondingly compressed.

The lead controller of Fig. 4 may be used whether the original damping constant $\zeta >$ or $< 1$, and it is effective to give an ultimate damping constant $\zeta_T$ at any selected value within a wide range, while still giving a frequency-scale expansion. It is recognized that in most cases optimum damping is usually not actually critical damping but something slightly less, preferably between 0.5 and 1.0; hence the controller of Fig. 4 is usually to be preferred to cascaded elemental circuits of the type shown in Fig. 3, even when the latter can be used.

Although the foregoing applies to what is termed a "third-order" servo, the results may be generalized. In general, the frequency-dependent portion of the transfer-function may be represented by $$G(s) = \frac{1}{s^n(s+c_1)(s+c_2) \ldots} \quad (15)$$

For reasons apparent to those skilled in network theory, the only terms of interest from the standpoint of lags are $(s+c_1)$, $(s+c_2)$, etc. The number and size of the $c$'s are an indication of the slowness of the system. In general there is one $(s+c)$ term for each independent energy-storing device (mass, spring, inductance, capacitance, etc.) in the system.

A somewhat more general expression for $G(s)$ would involve numerator terms $(s+b_1)(s+b_2)$ .... In so far as the $b$'s have positive real parts they correspond to control elements which may be considered as part of the controllers of this invention. Any $b$'s with negative real parts are analogous to network structures derivable only from lattice types, which find no counterpart in most present-day servos; their presence can be easily accounted for, if necessary, but for simplicity, it will be assumed that (13) represents all physical servos with sufficient generality.

It is possible to cancel any or all of the $(s+c)$ terms of the denominator by using networks of the types represented by Figs. 3 and 4. Each cancellation leaves in the denominator a term of the form $$\left(\frac{s}{\alpha} + c\right)$$

indicating an extension of the frequency range and a corresponding compression of the time scale. The total attenuation, which may be termed $\alpha_T$, is preferably allocated to different circuits in such a manner that the roots of the denominator terms represent the same, or nearly the same, frequencies. It will be understood that the terms with small roots require the most compensation; a term for which the $c$ is sufficiently large may not require compensation and the available attenuation may be more profitably allocated to other factors, as in the illustration following Equation 10.

Controllers for which the transfer-function is a second-degree expression have sometimes been referred to as "first and second degree controllers." Thus in Fig. 3, the first network could be considered as approximating a differentiating network; it would in fact approach a true differentiating network as the resistance increased; that is to say, the greater the attenuation the more nearly is the voltage across the condenser proportional to the time derivative of the voltage across the whole network. Since the force or torque due to viscous damping also involves a derivative term, it has been proposed to use a "derivative" controller to alter the damping factor in an elementary servo. Since the true derivative is approached only with infinite attenuation, the use of such devices with very high attenuation has been considered essential.

The use of two cascaded "derivative" circuits would theoretically give both first and second derivative control. The second derivative term has been suggested to provide "negative mass," since the force or torque due to mass or inertia involves the second time derivative. From this it can be shown theoretically that the positive mass of the motor and load can be almost, if not completely neutralized. But this neutralization of mass, even if it were not possible for other reasons, would require an infinite attenuation (with corresponding infinite amplification). Efforts to provide neutralization of mass have been unavailing and it has been supposed that "second derivative" control was useless because the conditions of infinite attenuation could not be realized.

According to the present invention, the use of a second degree lead control with a moderate and easily realizable attenuation produces a highly satisfactory result. Thus, a value of 10 for the overall constant $\alpha_0{}^2$ has been found entirely practical.

All of the preceding derivations have indicated that by sufficiently increasing the attenuation (and the amplification correspondingly), the servo can be made as fast as desired. An infinitely rapid response is of course impossible. It is now important to determine how far, in any given case, the response may be improved by the use of lead controllers.

Thus far the description has assumed ideal devices; thus in Equations 2 to 14, it has been assumed that the servo can be characterized by the "third-order" function over the entire frequency range from zero to infinity and that the controller can likewise be characterized as a "second-degree" function over the same range. These assumptions are justified at low frequencies, but not at high frequency. At high frequencies certain approximations previously justified can no longer be made. The masses of springs and other small parts, yields in shafts, leakage in hydraulic systems, distributed capacitances, and other "parasitic" effects become important. Each independent energy-storing device which must be thus accounted for increases the order of the system. It is not possible as a practical matter to evaluate all of these variables, nor to construct a controller of a sufficient number of stages to effect the complete compensation. The conclusions herein reached are valid only over the frequency ranges for which the transfer-functions adequately express the physical operation of the mechanisms.

Thus, if a servo having a resonant frequency $\omega_0$ is used with a lead controller having a theoretical capacity for frequency range extension by a factor $\alpha$, the transfer functions of both the servo and the controller should be such as to characterize the physical elements over the range $\alpha\omega_0$. In most cases, it is sufficient to represent the servo as a third-order system if the frequency range extension is not greater than 5, and this will frequently give the desired improvement.

To determine the usable limit of attenuation in any given case, first determine the transfer-function, as has heretofore been done, by considering only the principal elements of the system. Suppose that this gives a third-order function, the frequency-dependent portion of which is $$G(s) = \frac{1}{s(s+c_1)(s+c_2)}$$

For purposes of example, let it be assumed that $c_1$ is considerably less than $c_2$. Let a single stage lead-controller of the type of one of the stages of Fig. 3 be used. This controller may be selected in such a manner as to have a transfer-function (omitting constant multiplier terms) of $$\frac{s+c_1}{s+\alpha c_1}$$

Therefore, the $(s+c_1)$ terms cancel and the function for the compensated system is $$\frac{1}{s(s+\alpha c_1)(s+c_2)}$$

For any given value of $\alpha$ such that $\alpha c_1 \leq c_2$, this single stage controller gives the optimum improvement. This is the condition illustrated by the discussion following equation 10. In that particular example $c_2 = 4c_1$, hence if an attenuation no greater than 4 is chosen, there would be no benefit in using anything more than a simple single stage controller. When the two factors $s+\alpha c_1$ and $s+c_2$ are equal, the frequency scale expansion factor is 2.

If a greater expansion is desired, the attenuation may be increased. For values above 4, it is theoretically desirable to use a second degree lead-controller and allocate the total attenuation to the two factors in such a way as to cancel denominator terms in the manner previously described. However, until $\alpha c_1$ is about twice $c_2$, it is entirely practical to use only a single stage. An increased improvement will be obtained as $\alpha$ is increased. The improvement would be somewhat enhanced by using second-degree control, but the advantage would not justify the additional expense. In this example, this criterion justifies using an attenuation about equal to 8 in a single stage.

If the $c$-terms are approximately equal in magnitude, so that one is less than twice the other, optimum improvement requires an added degree of lead control either by a two-stage circuit as in Fig. 3, or by the network of Fig. 4. As the overall attenuation $\alpha^2$ is increased, the attenuation is preferably allocated to the two factors in such a manner that $\alpha_1 c_1$ and $\alpha_2 c_2$ are equal in magnitude. It is now important to determine how far the expansion of scale can be carried. This determination can be reached by generalizing the foregoing conclusions.

If $\alpha$ is to be considerably increased, it may be necessary to account for higher orders in the servo. For example, in the expression (2a) an "ideal" condition was assumed, namely that the torque of the control motor is proportional to the amplifier input. Due to inductance in the field of the control motor this relation is not exact. If the lag due to the inductive field circuit is accounted for, an additional lag term $(s+c_3)$ is introduced into the denominator of the servo transfer function. Usually this new term $c_3$ is much larger than $c_1$ or $c_2$ and does not require compensation for values of $\alpha$ heretofore considered.

Carrying along the same example, a second-degree controller adjusted for compensation of the $c_1$ and $c_2$ terms would result in a transfer-function $$\frac{1}{s(s+\alpha_1 c_1)(s+\alpha_2 c_2)(s+c_3)}$$

wherein the optimum adjustment is for $\alpha_1 c_1$ to equal $\alpha_2 c_2$ in magnitude. So long as $\alpha_1 c_1 \leq c_3$ a second-degree controller will give optimum improvement. Actually for reasons identical with those mentioned above, a second-degree controller would be entirely adequate practically for values of $\alpha$ up to that which makes $$\alpha c_1 = \alpha c_2 = 2c_3$$

Further increase in attenuation would justify third-degree of lead control, for which purpose a single stage controller could be cascaded with a controller of the Fig. 4 type.

If an attempt were made further to improve the transient response, the attenuation would be still further increased, additional lag factors would have to be considered and additional stages of lead control would be required. Thus, the assumption that the output speed of the servo motor is always proportional to the setting of the control motor may not be justified; a lag term will be introduced if the inertia of the load is taken into account.

As an empirical rule it may be stated that in most cases an attenuation of about 25 may be used effectively with no more than a second-degree controller. This corresponds to a five-fold improvement in transient response. It appears also that new c-terms as they are brought in are considerably larger than the previous maximum c-terms so that a rough rule is that each increase of attenuation by a factor of five requires another stage or degree of lead control.

It is to be remembered that attenuation must be made up by amplification and an economic limit to amplification may be soon reached. Furthermore a practical limit to increase of the speed of response is imposed by the necessity of increasing the power of the driving motor and strengthening the various parts of the system and load to withstand the stresses due to sudden changes of speed. It appears probable that with present-day equipment a second-degree lead controller will provide substantially the maximum obtainable response, but the present invention involves all criteria necessary for extending the limits to substantially any desired extent.

It will be understood that the controllers of the present invention may take various physical forms; for example, a single stage controller of inductance-resistance type may be substituted for the capacitance-resistance type, as will be clear to those familiar with network analysis. Furthermore, where high gain is required, regenerative amplifiers may be availed of to reduce the number of stages of amplification necessary in the system, in which case the control networks may be situated either in th direct path or the feedback path.

Although the control systems heretofore described have been electrical, the same reasoning may be applied, by well-known analogy, to purely mechanical lead controllers. An example of a hydraulic amplifier with "second-degree" lead controller is given in Fig. 5.

This apparatus comprises a piston valve 40 in a cylinder 42 having ports 44 connected with a power piston 46 in a cylinder 48. A sleeve 50 is free to slide between the piston valve 40 and its cylinder. A repeat-back connection 52 is pivoted at 54 to the power piston rod and at the other end to a link 56 connected with the sleeve. At an intermediate point 58 the connection 58 is pivoted to other linkage to be later described. Oil for operating the power piston in accordance with motions of the pilot piston is supplied through suitable piping. This is a well known form of hydraulic amplifier in that a displacement of the piston valve from neutral causes a greater displacement of the power piston from neutral. The amplication factor of the device is $$\frac{d_2}{d_1}$$

hereinafter referred to as $$\frac{1}{a_1}$$

A link 60 pivoted at 62 on a fixed base is connected at one end through a dashpot 64 and a parallel spring 66 to the power piston end of the connection 52. At the other end the link 60 is connected with a link 68 which is pivoted to the connection 52 at the point 58 heretofore mentioned. Beyond the point 58 the link 68 carries a mass M and the piston of a dashpot 70, the cylinder of which is fixed on a suitable support.

The lengths of the portions of the arms 60 on opposite sides of the pivot 62 are designated $d_3$ and $d_4$ and the quantity $a_2$ is used to designate the ratio $$\frac{d_4}{d_3}$$

It will be noted that $a_1$ is less than and $a_2$ greater than unity.

The power piston 46 is connected with a control mechanism 72 conveniently in the form of the well-known tilt box for controlling the operation of the hydraulic motor 74 which is connected with the load indicated diagrammatically at 76. Motions of the output are controlled by an input device 78 of any desired character here shown as a hand crank. A connection which may be either mechanical or electrical according to standard servo technique runs from the output shaft back to the input. The connection is diagrammatically indicated at 80. Through a differential 82 (similar to 18) the difference between displacement of the input 78 and the output 76 is measured and this difference, which constitutes the error, is fed into the system by link 84 connected with the pilot piston 40.

For an analysis of this device let $f_1$ and $f_2$ represent the viscous damping coefficients of the dashpots 64 and 70 respectively and $k$ the elastic coefficient of the spring 66. If an input displacement $x_1$ is applied to the pilot piston 40 the power piston 46 will ultimately be displaced a distance $$x_2 = \frac{x_1}{a_1}$$

In general the ratio of the Laplacian transforms of $x_2$ and $x_1$ is the transfer function heretofore designated as $KG(s)$. The transfer function can be computed by straight-forward analysis. The derivation is omitted here for reasons of simplicity but the final value of the transfer function (if $a_1$ is large) is as follows:

$$KG(s) = \frac{1}{a_1} \frac{s^2 + \frac{s}{M}\left(f_2 + \frac{f_1}{a_2^2} + \frac{k}{a_2^2 M}\right)}{s^2 + \frac{s}{M}\left[f_2 + \frac{f_1}{a_2^2}\left(1 + a_2 + \frac{a_2}{a_1}\right)\right] + \frac{k}{a_2^2 M}\left(1 + a_2 + \frac{a_2}{a_1}\right)}$$

(16)

It will be understood that this is the transfer function of the amplifier and lead controller system only and does not take account of the characteristics of the control motor 72 and servo motor 74. The elements represented by the above equation correspond exactly to the amplifier 10 and lead control circuits of Fig. 4.

It will be noted that this equation is identical in form with Equation 14 for the electrical second-degree lead controller, if $$K = \frac{1}{a_1}$$

$$\omega_c^2 = \frac{k}{a_2^2 M}$$

$$\alpha_0^2 = 1 + a_2 + \frac{a_2}{a_1}$$

$$\zeta_c = \frac{1}{2\sqrt{kM}}\left(a_2 f_2 + \frac{f_1}{a_2}\right)$$

$$n = 1 + \frac{f_1}{a_1} \frac{a_2(a_1 + 1)}{f_1 + a_2^2 f_2}$$

The limits between which the factor $n$ can vary are established by the relative magnitudes of $f_1$ and $f_2$. If $f_1 = 0$, $n = 1$. This corresponds to complete omission of the dashpot 64 so that the spring 66 is the only connection between the pair ends of the links 52 and 60. If $f_2 = 0$, $n = \alpha_0^2$. This corresponds to omission of the dashpot 70. As in the electrical case $n$ may therefore vary between the limits 1 and $\alpha_0^2$ by suitable choices of the damping coefficients $f_1$ and $f_2$. As in the electrical case the damping factor of the compensated system may be chosen at any point in the wide range between $$\frac{1}{\alpha_0}$$

and $\alpha_0$ times damping factor of the original system.

The operation of the apparatus of Fig. 5 may be described qualitatively in the following manner: If the piston valve 40 is displaced downwardly by an amount $x$, the sleeve 50 will ultimately be displaced upwardly by the same amount and the power piston 46 will be displaced upwardly by a greater amount. The ultimate position of the power piston depends on the speed with which the piston valve 40 is moved. Thus if piston valve 40 is moved very slowly, the dashpot 70 and the mass M do not resist the motion of the piston 46. The spring 66 is slightly compressed, and the force of compression is transmitted to the lever 60 in such a direction as to push the sleeve 50 down. Since the pivot 62 is nearer the right than the left end of the arm 60, it takes only a slight upward motion of the piston 46 to move the sleeve 50 down far enough to close the lands of the piston valve 40. Stated in another way, a large slow movement of the piston valve 40 produces only a relatively small motion of the power piston; this corresponds to a small value of $s$ in (16). On the other hand, if the piston valve 40 is moved downward very rapidly, the power piston 46 follows rapidly. The mass M is unable to accelerate and the pivot 58 remains practically stationary. The action of the arm 60 is unimportant under these circumstances, hence it requires a large displacement of 46 to cause a relatively small displacement of the sleeve 50; actually the ratio is $$\frac{d_2}{d_1}$$

Since $$\frac{d_2}{d_1}$$

it greater than unity it means that for a rapid motion the piston 46 moves more than the piston valve 40. This can also be seen by placing $s = \infty$ in (16).

In conclusion it may be stated that the present invention associates with each lag-producing element of the uncompensated servomechanism a lead-controlling element which partly neutralizes the lag. By lag producing element is meant any combination of mass and friction or elasticity and friction (or combinations of their electrical counterparts, inductance, capacitance and resistance) by which the output is caused to lag in phase behind the input. For example, mass and damping together give rise to a lag element $$\frac{1}{s + \frac{M}{f}}$$

or $$\frac{1}{s + c_1}$$

whereas mass, elasticity and friction give rise to a quadratic expression which is factorable into a form like $$\frac{1}{(s + c_1)(s + c_2)}$$

The $c_1$ and $c_2$ terms are not necessarily individually associated with the separate elements of mass and elasticity, because each c-term involves both parameters, but it may be said that for any given number of independent energy storing elements in the system, there is an equal number of $(s+c)$ terms in the mathematical expression. The term "lag-producing element" may therefore be considered as a physical manifestation of an individual lag term.

Consider any single lag term $$\frac{1}{s + c_1}$$

and convert to frequency by the substitution $s = j\omega$. Then the lag term is $$\frac{1}{c_1 + j\omega}$$

For a sinusoidal input of frequency $\omega$ the output lags behind the input by an angle $\varphi$, where $$\tan \phi = \frac{\omega}{c_1} \qquad (17)$$

(It will be understood that the term "input" here means "error," since error is the input to the servo controller.) When several lag terms are present, the total lag angle is the sum of the lag angles of the individual factors.

If a lead-control network is applied to any single lag-producing element defined above, and the constants are so chosen that the previously mentioned cancellation can be carried out, the effect on the system is given by $$\frac{1}{c_1 + j\omega} \cdot \frac{c_1 + j\omega}{\alpha c_1 + j\omega} = \frac{1}{\alpha c_1 + j\omega} \qquad (18)$$

and the compensated lag angle is now $$\tan \phi = \frac{\omega}{\alpha c_1} \qquad (19)$$

Thus the lag is reduced, or stated in another way, a lead angle is introduced. The magnitude of the lead angle for the single element is the difference between the angles given by (17) and (19). For a number of lag-producing elements, optimum lead angles are introduced by matching the lead control elements to the individual lag elements. This matching, or approximate matching of a lead-control element to a lag-producing element is the physical action represented by the mathematical cancellation indicated above. When the constants are so chosen that the lead-control element is matched to the lag-producing element, the frequency scale is expanded by the factor $\alpha$, provided the attenuation is made up by a proper increase of gain.

In a system having a number of lag-producing elements, not only are the individual lead-control elements matched with the corresponding lag-producing elements, but a relation preferably exists between the lead-controlling elements themselves as explained following the generalized expression (15), wherein the total attenuation is allocated to the separate elements in such fashion that the compensated natural frequencies of the elements are approximately the same.

It will be seen that an indiscriminate or improper choice of parameters, particularly in a controller of the second or higher degree, will rarely give sufficient improvement to justify the expense of the necessarily increased amplification. According to the present invention, for any predetermined value of attenuation, the optimum improvement in transient response can be approached by selecting the parameters of the several lead-control elements to substantially match the lag-producing elements of the servomechanism.

Having thus described the invention, I claim:

1. A servomechanism having input means, output means, error-measuring means responsive to differences between the input and output means for generating an error signal as a function of said difference, means responsive to the error signal for operating the output means, the servomechanism having lag-producing elements acting to cause a phase-lag in the output relative to the input, compensating means having provision for diminishing attenuation with increasing frequency, said compensating means having elements individually matched to the lag-producing elements of the servomechanism.

2. A servomechanism having input means, output means, error-measuring means responsive to differences between the input and output means for generating an error signal as a function of said difference, means responsive to the error signal for operating the output means, the servomechanism having lag-producing elements acting to cause a phase-lag in the output relative to the input, said elements being each designated by the expression $$\frac{1}{s+c}$$

and compensating means having provision for diminishing attenuation at increasing frequency, and having elements each designated substantially by the expression $$\frac{s+c}{s+\alpha c}$$

to match the individual lag-producing elements of the servomechanism.

3. A servomechanism having input means, output means, error-measuring means responsive to differences between the input and output means for generating an error signal as a function of said difference, means responsive to the error signal for operating the output means, the servomechanism having lag-producing elements acting to cause a phase-lag in the output relative to the input, the lag-producing elements being designated by an expression $$\frac{1}{(s+c_1)(s+c_2)\ldots}$$

and compensating means having lead-control elements separately designated $$\frac{s+c}{s+\alpha c}$$

wherein the parameters are chosen to effect partial but substantially optimum neutralization of the lag-producing elements of smallest c-values for any given value of attenuation constant $\alpha$.

4. A servomechanism having input means, output means, error-measuring means responsive to differences between the input and output means for generating an error signal as a function of said difference, means responsive to the error signal for operating the output means, the servomechanism having lag-producing elements acting to cause a phase-lag in the output relative to the input, and compensating means to attenuate low frequencies, said compensating means having lead-control elements individually matched to the major lag-producing elements to effect partial but substantially optimum neutralization of lag for any predetermined value of attenuation.

5. A servomechanism having input means, output means, error-measuring means responsive to differences between the input and output means for generating an error signal as a function of said difference, means responsive to the error signal for operating the output means, the servomechanism having lag-producing elements acting to cause a phase-lag in the output relative to the input, a lead-control network comprising resistances across the input, a series circuit across a portion of said resistances, said circuit including capacitance, resistance and inductance in series, and an output connection to a selected point of said last-named resistance.

6. A servomechanism having input means, output means, error-measuring means responsive to differences between the input and output means for generating an error signal as a function of said difference, means responsive to the error signal for operating the output means, the servomechanism having lag-producing elements acting to cause a phase-lag in the output relative to the input, and a lead controller for which the ratio between output and input is given by the expression $$\frac{s^2 + 2\zeta_c \omega_c s + \omega_c^2}{s^2 + 2n\zeta_c \omega_c s + \alpha^2 \omega_c^2}$$

wherein the term $n$ is between 1 and $\alpha^2$, and the values of damping factor $\zeta$ and natural frequency $\omega_c$ are selected to match lag-producing elements of similar damping and natural frequency values of the servomechanism.

7. In a servomechanism having lag-producing elements acting to cause a phase-lag in the output relative to the input, a lead-controller having a hydraulic amplifier, including a piston valve, power piston, and a repeat-back link, the link being pivoted at a point determining the amplification factor of the amplifier, and means including mass, elasticity and damping for effecting variable attenuation of the motion of the power piston relative to the pilot piston in accordance with frequency whereby the maximum attenuation is attained at very low frequencies.

8. In a servomechanism having lag-producing elements acting to cause a phase-lag in the output relative to the input, a lead-controller having a hydraulic amplifier, including a piston valve, power piston, and a repeat-back link, the link being pivoted at a point determining the amplification factor of the amplifier, a second pivoted link connected to the repeat-back link at the power piston and through a spring and also connected with said pivot of the repeat-back link, a mass mounted adjacent the pivot of the repeat-back link, and damping means for restraining motion of the link.

9. In a servomechanism having lag-producing elements acting to cause a phase-lag in the output relative to the input, a lead-controller having a hydraulic amplifier, including a piston valve, power piston, and a repeat-back link, the link being pivoted at a point determining the amplification factor of the amplifier, a second pivoted link connected to the repeat-back link at the power piston end through a spring and dashpot and also connected with said pivot of the repeat-back link, a mass movable with the pivot, and a dashpot for restraining high-frequency motions of the mass.

10. A servomechanism having input means, output means, error-measuring means responsive to differences between the input and output means for generating an error signal as a function of said difference, means responsive to the error signal for operating the output means, the servomechanism having lag-producing elements acting to cause a phase-lag in the output relative to the input, and compensating means to attenuate low frequencies, said compensating means comprising electrical networks in a plurality of stages, and including lead-control elements individually matched to the major lag-producing elements to effect partial but substantially optimum neutralization of lag for any predetermined value of attenuation.

11. A servomechanism having input means, output means, error-measuring means responsive to differences between the input and output means for generating an error signal as a function of said difference, means responsive to the error signal for operating the output means, the servomechanism having lag-producing elements acting to cause a phase-lag in the output relative to the input, and compensating means to attenuate low frequencies, said compensating means comprising a plurality of stages of electrical lead control circuits, each stage having a transfer function of the form $$\frac{s+c}{s+\alpha c}$$

wherein the parameters are individually matched to lag-producing elements of servomechanism.

12. A servomechanism having input means, output means, error-measuring means responsive to differences between the input and output means for generating an error signal as a function of said difference, means responsive to the error signal for operating the output means, the servomechanism having lag-producing elements acting to cause a phase-lag in the output relative to the input, a lead-control network including capacitance, inductance and resistance for which the transfer-function matches lag-producing elements of the servomechanism.

ALBERT C. HALL.

REFERENCES CITED

The following references are of record in the file of this patent:

UNITED STATES PATENTS

| Number | Name | Date |
|---|---|---|
| 1,831,516 | Stewart | Nov. 10, 1931 |
| 2,020,847 | Mitereff | Nov. 12, 1935 |
| 2,197,743 | Crafts | Apr. 16, 1940 |
| 2,233,415 | Hull | Mar. 4, 1941 |
| 2,251,973 | Beale et al. | Aug. 12, 1941 |
| 2,409,190 | Brown et al. | Oct. 15, 1946 |

FOREIGN PATENTS

| Number | Country | Date |
|---|---|---|
| 212,872 | Germany | Aug. 13, 1909 |
| 53,192 | Austria | Apr. 25, 1912 |